2 Sheets—Sheet 1.
J. G. DUNHAM.
Mower.
No. 2,647. Reissued June 11, 1867.
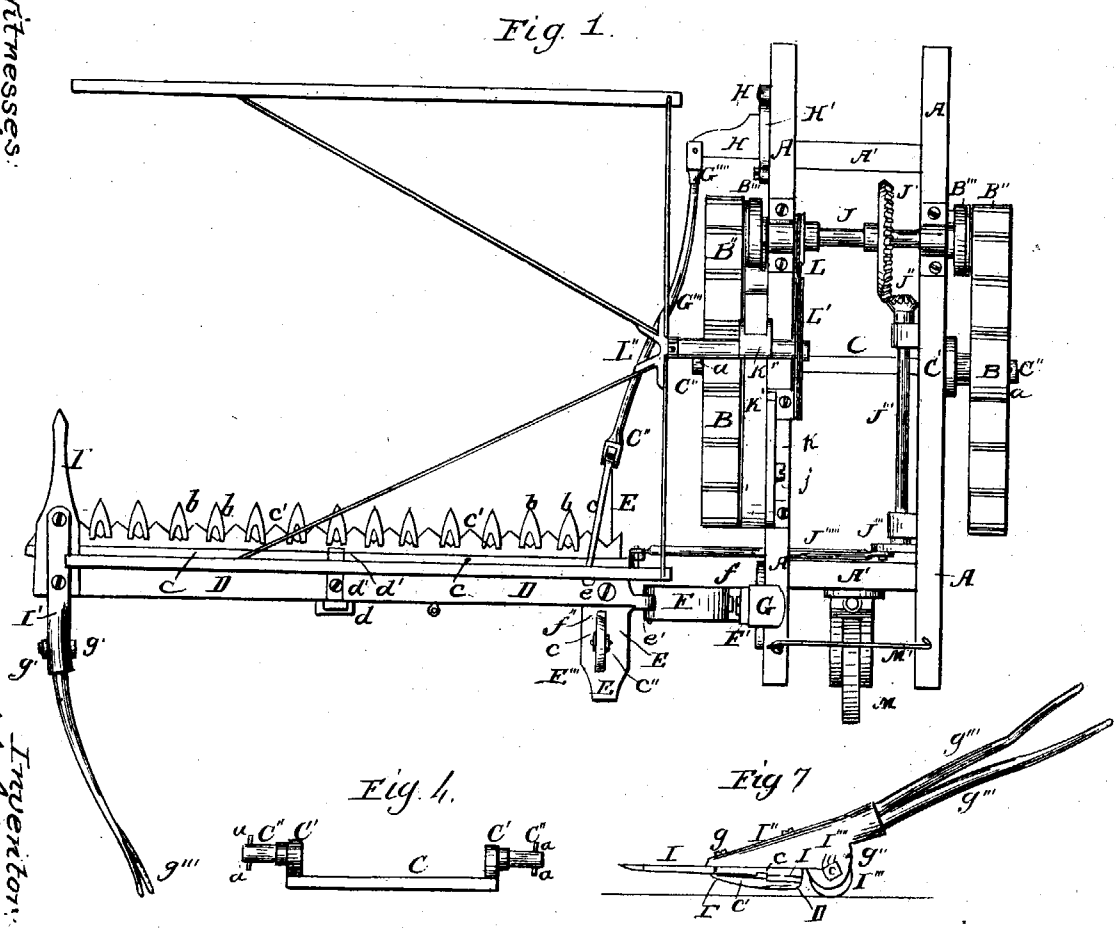
Witnesses:
W. Yoke Allen
J. C. W. Drasenk
Inventor:
John G. Dunham
By his atty.
Thos. H. Dodge
N. PETERS, Photo-Lithographer, Washington, D. C.

2 Sheets—Sheet 2.
J. G. DUNHAM.
Mower.
No. 2,647. Reissued June 11, 1867.
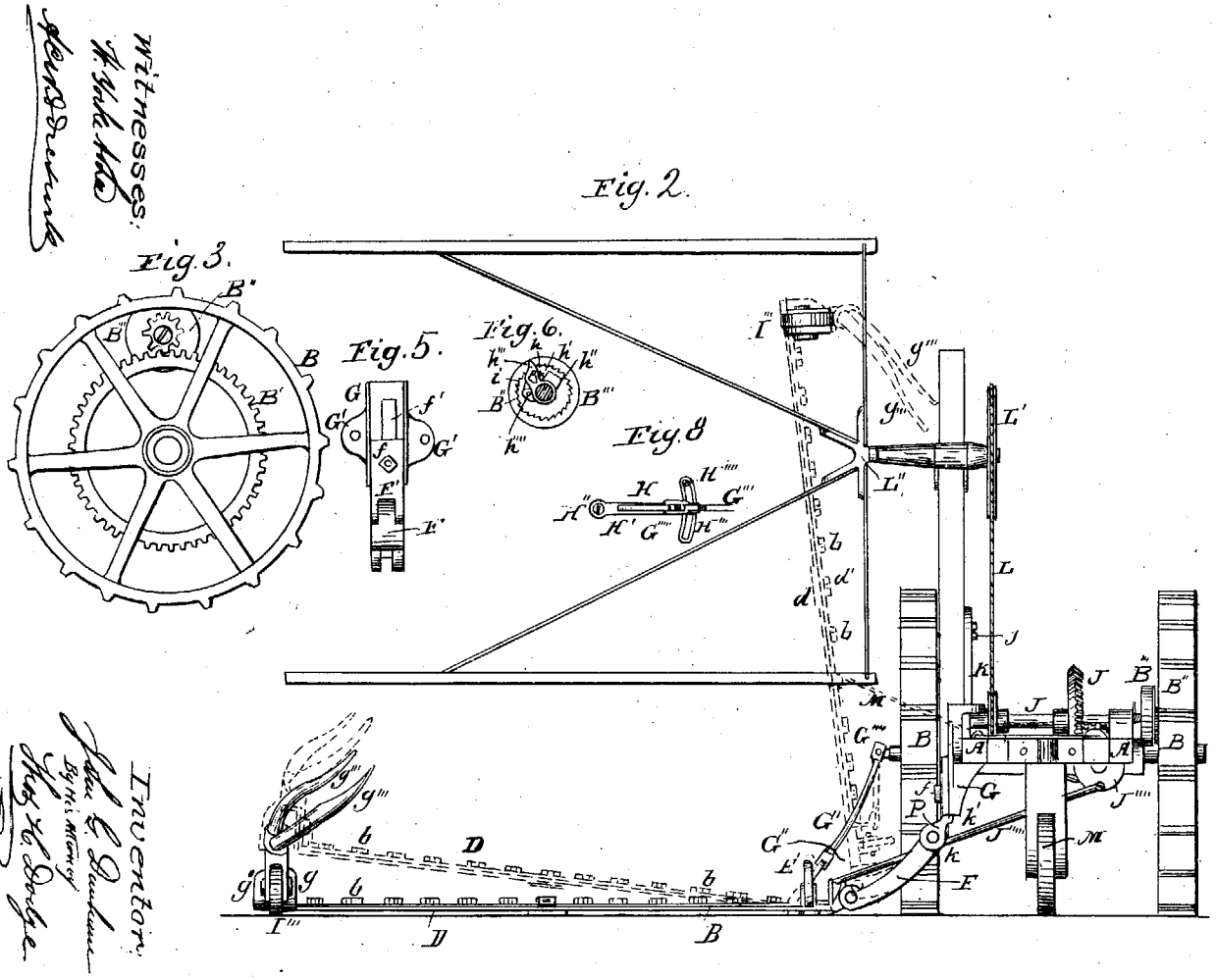
Witnesses:
W. York Hoke
Geo. Dresserk
Inventor:
John G. Dunham
By his Attorney
Thos. H. Dodge
N. PETERS. Photo-Lithographer, Washington, D. C.

United States Patent Office.

PETER V. STAATS, OF RARITAN, NEW JERSEY, ASSIGNEE BY MESNE ASSIGNMENTS OF JOHN G. DUNHAM.

*Letters Patent No.* 30,961, *dated December* 18, 1860; *reissue No.* 2,647, *dated June* 11, 1867.

DIVISION A.

IMPROVEMENT IN MOWING MACHINES.

The Schedule referred to in these Letters Patent and making part of the same.

TO ALL WHOM IT MAY CONCERN:

Be it known that JOHN G. DUNHAM, of Raritan, in the county of Somerset, and State of New Jersey, did invent certain new and useful improvements in Mowing Machines, of which the following is a full, clear, and exact description, reference being had to the accompanying drawings which make part of this specification, and in which—

Figure 1 represents a plan or top view of a mowing machine embracing said improvements.

Figure 2 represents a view in elevation of the same as seen from the rear, the black lines showing the cutting apparatus resting on level ground, while the red dotted lines show its outer or divider end raised by being drawn over a ridge or elevation, and the red full lines show it as lifted and folded against the frame for transportation.

Figure 3 represents a similar view of one of the driving and main gear-wheels, together with one of the spur-wheels on the counter-shaft, as seen from the outer side.

Figure 4 represents a similar view of the stationary metallic axle or journal which supports the main frame, and upon which the driving-wheels revolve.

Figure 5 represents a similar view of the coupling-arm and sliding socket piece by which the finger-beam is attached to the main frame and raised or lowered thereon.

Figure 6 represents the details of one of the backing ratchets.

Figure 7 represents a similar view of the divider, grain-wheel, and track clearer; and Figure 8 represents the details of the device by which the front end of the drag-bar is connected to the main frame.

In this instance a main frame, A A′, is shown as mounted on two main driving and supporting wheels B B, turning on journals C″ at each end of a stationary axle, C. The axle is horizontal in its central portion, and bent up at right angles at each end in order to form shoulders or flanges, C′, to the inner side of which the side pieces A of the frame are bolted. The journals C″ project outward from the shoulders. The advantage of this mode of construction is that the frame is arranged between the wheels, by which means it can be made lighter, stronger, and less bulky. The frame is securely bolted to the axle, which prevents torsion of the frame, and by dropping the central part of the axle below the bend of the journals the crank-shaft can be arranged to pass over it directly from a counter-shaft on one side of the axle, and be supported on a bearing on the frame on the other end, thus securing a crank-shaft of the shortest possible length, and avoiding the use of down-hangers. Furthermore, this mode of construction dispenses with the use of boxes for the bearings of the axle, and the frame can be set any distance desired either above or below the axle of the wheels by increasing the length of the bends or knees C′, or by placing blocks of varying thickness between the frame and axle.

The finger-beam D is made of metal, and securely fastened at its inner or heel end to the inner shoe E, which is formed with a wide rear part E″, in which is an opening for a conical wheel, E‴, the journal of which rests in upwardly projecting ears *e*″ cast upon the shoe E. The front of the shoe E is recessed down so that the finger-beam has a firm shoulder against which to abut, while the front of the shoe is narrowed as it projects forward, and terminates by being hinged to the wrist or swivelling joint G″, into which one end of the truss-rod G‴ screws, while the other end screws into a wrist, G⁗, hinged to a projection or bracket, H, pivoted at H″ to the inner side of the main frame so that it can be raised or lowered in the arc of a circle around its pivot, and be held in any desired position by a set-screw, H⁗, which passes through a slot, H, in the bracket H′ into the frame. A lug, *e*′, projects from the inner shoe E, and is hinged between corresponding lugs on the lower end of a curved piece or coupling-arm, F, the upper end of which coupling-arm is correspondingly hinged to the lower end of an arm, F′, sliding vertically in a groove in a vertically slotted down-hanger or bracket, G, bolted to the main frame, the arm F′ being raised or lowered and held at any desired elevation by means of a vertical slot, *f*′, in the down-hanger, and a set-screw, *f*, on the sliding-arm. By this means the inner or heel end of the finger-beam can be carried at any desired elevation above the ground. It will be observed that both joints of the coupling-arm F are parallel to each other in the same vertical plane and outside of the main frame, which mode of construction secures a finger-beam free to rise and fall at either end, and independently of the other while using a short coupling-arm.

To the outer end of the finger-beam is attached a shoe, I, the under side of which is recessed a little so as to keep it properly in place. A small runner, I′, is fastened to the under side of the finger-beam D, and also to the under side of the shoe I in front of the point of the cutters *c′*. This runner I′ serves to support the outer end of the cutter-bar and cutter.

To the upper side of the outer end of the finger-beam is attached a cap-piece, I″, which is fastened to the top of the shoe I and finger-beam D by screws *g g*. The under side of the cap-piece I″ is cast with a groove for two reasons: first, it makes it lighter, and second, it affords the requisite protection and space for the play of the conical wheel I‴, whose journal I⁗ is supported in the sides of the cap-piece I″, which has openings so that the journal of the wheel I‴ can be set up or down, and thus enable the finger-beam and cutter to be adjusted to cut the grass at different heights from the ground. The journal of wheel I‴ is provided with a head, *g′*, and a nut, *g″*, whereby it can be held in different positions in the openings in the sides of the cap-piece I″. The rear of the cap-piece I″ has two parallel sockets for the reception of clearing-arms *g‴ g‴*, which turn the grass after it has been cut inwardly so as to leave a clear space next to the standing grass.

Each driving-wheel B carries a main gear-wheel, B′, driving a corresponding pinion, B″, connected with a counter-shaft, J, by a backing ratchet, B‴, which drives the gearing when moving forward, but allows it to turn loosely on the axle when backing. The counter-shaft extends transversely across and beyond the frame, (the spur-wheels and ratchets being arranged between the frame and driving-wheels,) and carries (inside the frame) a bevel-wheel, J′, driving a corresponding pinion, J″, on a crank-shaft, J‴, passing over the bent axle parallel to the outer frame-piece A, and turning in suitable bearings supported by this timber.

The cutters are reciprocated as usual by a pitman, J⁗, connected to the crank J⁗. A caster-wheel, M, supports the rear end of the frame, and a tongue is hinged to the front end of the frame by which to draw the machine. The heel of the finger-beam is kept from falling too low down, or from swinging under the frame, by a projection, K, on the under side of brace F, which projection abuts against a shoulder, K′, on the piece F′. The finger-beam, when folded up, as shown in full red lines in fig. 2, is held in that position by a hook, M′. The drag-bar G‴ is slightly sprung by the folding of the beam, and thus tends to uphold the coupling-arm F, as shown in fig. 2.

What is claimed herein as the invention of JOHN G. DUNHAM, is—

1. The combination in a mowing machine of a stationary metallic axle, with the portion between the bearings of the wheels bent, and a crank-shaft arranged transversely thereto, with the driving-gear arranged on one side of the axle, and the crank and pitman on the other.

2. The combination in a hinge-joint mowing machine of two driving-wheels, a main frame located between the wheels, and extending both in front and rear of the main axle, with a hinged or limber tongue in front by which to draw the machine, and a caster-wheel to support the back end of the frame.

3. Connecting a short laterally projecting finger-beam to the inner side of the main frame by a coupling-arm in the same vertical plane as the finger-beam, and having two parallel joints transverse to the beam whereby a short coupling-arm can be used, and yet either end of the cutting apparatus be free to rise or fall independent of the other.

4. The combination, in a mowing machine, of two main carrying-wheels, a main frame located between the wheels, and a laterally projecting hinged finger-beam having two parallel joints in the coupling-arm, with a brace or drag-bar for the purpose of resisting the backward strain of the finger-beam, supported at the upper end by means of the main frame in front of the inside carrying-wheel.

5. The combination, with a short laterally projecting flexible finger-beam having two parallel joints in the coupling-arm, (at right angles to the beam,) of a supporting-wheel attached directly to each end of and in rear of the finger-beam.

In testimony whereof I have hereunto subscribed my name.

PETER V. STAATS.

Witnesses:

JEREMIAH WHITENACK,

SAMUEL GANO, Jr.